United States Patent [19]
Berends

[11] 3,881,749
[45] May 6, 1975

[54] TOWING COUPLER ASSEMBLY FOR FACTORY MADE HOMES

[75] Inventor: Howard P. Berends, Fruitport, Mich.

[73] Assignee: Holland Hitch Company, Holland, Mich.

[22] Filed: Feb. 1, 1974

[21] Appl. No.: 438,870

[52] U.S. Cl. ............ 280/415 B; 52/143; 280/415 A; 280/423 R; 280/438
[51] Int. Cl. ............................................ B62d 53/06
[58] Field of Search ........ 280/423 R, 415 B; 52/143

[56] References Cited
UNITED STATES PATENTS

| | | | |
|---|---|---|---|
| 2,547,269 | 4/1951 | Kinsey | 280/423 R X |
| 2,925,135 | 2/1960 | Hamilton | 280/423 R X |
| 3,021,155 | 2/1962 | Sherman | 280/423 R |
| 3,442,409 | 5/1969 | Larson | 280/423 R X |
| 3,505,767 | 4/1970 | Fyle | 280/415 B X |
| 3,697,098 | 10/1972 | Fisher | 52/143 X |
| 3,747,788 | 7/1973 | Petetin | 280/423 R X |

FOREIGN PATENTS OR APPLICATIONS

| | | | |
|---|---|---|---|
| 834,612 | 2/1970 | Canada | 280/423 R |

Primary Examiner—Leo Friaglia
Attorney, Agent, or Firm—Price, Heneveld, Huizenga & Cooper

[57] ABSTRACT

A towing coupler assembly for removable attachment to a factory made home or the like having under-girders, for stable towing thereof. The assembly has a frame with an elevated front end and divergent lower rear ends. The front end has a coupler kingpin mounted with limited pivotal action on a longitudinal pivot axis. The frame rear ends extend under the home and attach to the under-girders. Compression units intermediate the front and rear ends are vertically operable to apply controlled compression between the home and the frame, to effect controlled load distribution and controlled elevation to the home front end. Special jack means allows attachment and detachment. Small wheels on the frame enable the novel assembly to be towed as a trailer when not attached to a home.

Preferably, a coupler ball on the novel assembly engages the conventional ball coupler on the home and acts as a fulcrum for easy mounting of the assembly. Alternatively, the novel towing coupler assembly can attach to a home or the like not having the conventional ball coupler.

21 Claims, 12 Drawing Figures

TOWING COUPLER ASSEMBLY FOR FACTORY MADE HOMES

BACKGROUND OF THE INVENTION

This invention relates to apparatus for vehicular towing of bulky wheeled structure, especially factory made homes such as so-called mobile homes, modular homes, and prefabricated homes, all of which normally have the generally parallelepiped configuration. It more particularly relates to an attachable-detachable towing coupler assembly for factory made homes and the like.

The transportion of wide, bulky, factory made homes from the fabricator to the dealer or from the dealer to a site is basically accomplished by towing them on a wheeled undercarriage forming part of the home. A ball coupler on the front of the home is connected to a hitch ball on the rear of a special, shortened truck tractor for motive power. Manipulating this combination towing tractor and towed home structure constitutes a cumbersome, tricky, tiring, and exasperating task. The units are especially susceptible to weaving, twisting and whipping on the highway. Wind gusts play havoc as do the rapid sequence of positive side force-negative side force occurring with the passage of large semi-trucks. The ball hitch method of hauling causes a floating effect on the front tractor steering axle because the load of the towed unit is a considerable distance behind the rear tractor axle, causing teeter-totter action about the rear axle. Drivers of these haulers commonly grasp the steering wheel tightly and wrestle the rig constantly in response to these factors as well as road irregularities. This is extremely tiring, and moreover is dangerous to persons in other vehicles. Such rigs are formidable to meet and/or pass. Further, the size of these homes has steadily increased in the last several years, thereby magnifying the problem as is known to haulers, police agencies, and drivers who share the road system.

Not only does the combination weaving, twisting and whipping cause danger on the roads, but it also causes damage to the homes. Exterior door frames often break loose from the structure. Window frames do also. Not uncommonly windows even break. Interior paneling, doors, and cupboards wrench loose and pull partially apart. And the basic structural interconnections of the home can be weakened.

SUMMARY OF THE INVENTION

A primary object of this invention is to provide a towing coupler assembly for bulky wheeled structures, particularly factory made homes of basically parallelepiped configuration, enabling towing thereof with stability, greatly increased safety and minimal structural damage. The coupler assembly is attached beneath the front end portion of a mobile home in a special fashion, firmly securing the home against weaving, twisting, and whipping. The coupler enables assured level position of the home when hauled, and controlled load distribution on the axles. Connection to the towing vehicle is no longer a single point at a low elevation where the front of the home tends to rotate a substantial amount and twist it relative to the rear of the home.

Another object of this invention is to provide a stabilizing towing coupler assembly for factory built homes allowing easy connection thereof to the home and subsequent easy disconnection thereof for repeat use of the coupler. The novel assembly can be returned as a small trailer type vehicle by the truck tractor, to be used on the next home.

Another object is to provide a towing coupler assembly attachable without necessitating the removal of the standard coupler ball from the front of the home, if the standard coupler is on the home. Thus, this conventional ball coupler can be used to tow the home for short distances if desired, e.g., around a sales lot, or from one site to another.

Another object of this invention is to provide a stabilizing towing coupler assembly capable of actually employing the standard ball coupler on the front of the home to allow easy connection and disconnection of the novel coupler to the home.

Another object of the invention is to provide a towing coupler assembly which is not dependent upon the conventional ball coupler with its usual A-frame support. The novel assembly is attachable to and detachable from a load structure having no such coupler.

The novel coupler assembly effects a multiple point securement to the home structure. The hitch point to the towing vehicle is relatively high, near the center of gravity of the home, minimizing twisting of the front of the home relative to the rear, and removing the actual tendency of the front of the home to roll over, as on curves. A limited controlled rotation at the hitch is allowed to accommodate momentary tilting differential between the wheel axles of the home and the wheel axles of the truck.

The novel coupler assembly effectively converts the lurching home into a smoothly following vehicle, as evidenced by actual testing.

These and other objects as well as several other features will be apparent upon studying the following specification in conjunction with the drawings.

BRIEF DESCRIPTION OF THE DRAWINGS

FIG. 2 is an exploded perspective view of the towing coupler assembly, the rear of a truck tractor, and the front of the under structure of a mobile home or the like;

DESCRIPTION OF THE PREFERRED EMBODIMENT

Referring now specifically to the drawings, the towing coupler assembly 10 is primarily intended to be connected to the under support structure at the front of a generally parallelepiped shaped load 14, such load normally being a factory built home such as a so-called mobile home, modular home, prefabricated home, or the like. The home has a wheeled undercarriage (not shown), conventionally mounted thereunder toward the rear thereof. The coupler assembly is also releasably connected by a fifth wheel — kingpin coupler arrangement to the rear of a truck tractor 12.

The truck tractor 12 includes a conventional cab, front steering axle, engine, and drive train (not shown), the rear of the frame including the conventional pair of channel beams 18 interconnected at the rear by cross member 18' and mounted above the rear drive axle and wheel subassembly 20. Mounted on beams 18 is a fifth wheel type coupler subassembly 21, preferably of the fore-to-aft adjustable type in U.S. Pat. No. 2,985,463. This fifth wheel has conventional jaw means for clamping onto a kingpin mounted on the towing coupler assembly 10.

The elongated home 14 conventionally includes a pair of laterally spaced under girders 22, usually I-beams or tubular members of rectangular cross section, extending the length thereof, and interconnected on the front end by a cross member 24. Typically, such homes have a so-called A-frame ball type hitch unit projecting from the front thereof. This A-frame normally has a pair of forwardly convergent legs 26 (FIG. 2) extending beneath and in front of cross beam 24 and the superstructure 26 thereon, and terminating at their forward junction in a ball type coupling 28 of conventional type. The rear ends of legs 26 are secured to girders 22 while cross member 24 is secured to legs 26 intermediate the ends of the legs. Normally there is a screw type jack 30 adjacent this ball coupler for lowering and elevating it relative to a conventional ball hitch mounted on the rear end of the shortened hauling truck tractor.

It is customary in the trade presently to connect ball coupler 28 to the ball on the rear of the shortened tractor and haul the home from factory to dealer, from dealer to site, or from site to site, and the like, as is well known. The A-frame on the front of the mobile home sometimes is premanently affixed thereto, and sometimes is removable therefrom.

With this conventional hookup, the home has two point support on its wheeled undercarriage toward the rear thereof, and a third point at the ball coupler 28. Basically, the center of gravity of the load is above the plane defined by these three points. Thus, any unsteadying force from wind, side gusts of air because of passing vehicles, road irregularities, or curves, tends to shift the center of gravity in a fashion imparting a rollover influence to the structure. The generally universal connection at the ball hitch does not restrain such influence, and also enables the load to weave on the road, tends to allow twisting torsional stresses in the home structure, and allows the structure to whip. In fact, as is well known to drivers of these units, the constant plunging, twisting and weaving of the mobile home applies tremendous unsteadying forces to the towing truck tractor. Particularly noticeable are the stresses occurring with the passing of a semi-truck moving in the same direction. First the positive high pressure side thrust of air forces the mobile home and the rear end of the truck tractor away from the semi-truck to cause the front end of the towing tractor to be turned toward the semi, followed immediately by the negative suction effect as the semi trailer moves past, tending to draw the tractor and mobile home into the semi-truck. Consequently, drivers of these mobile home stub tractors constantly wrestle the rig against these dangerous forces. Their task is accentuated by the floating tendency of the tractor front axle.

The towing coupler assembly of this invention was developed to eliminate these instabilities. Experimental runs made with the novel unit while towing a mobile home have shown that the tractor and load assembly have admirable stability, even with the passing of a large semi-truck. It was demonstrated that, while using the novel towing coupler assembly, the driver has no more difficulty handling the unit than is experienced with a conventional truck-tractor, semi-trailer combination. These experimental runs demonstrated that the homes were not damaged during transfer as by twisting of door frames, window frames, breaking loose of interior doors, panels, and structure, and breakage of windows. Consequently, the homes are safer to haul, and arrive in excellent structural condition.

The towing coupler assembly 10 has a rearwardly bifurcated structure. It has lower rear beam portions. joined to an upwardly offset front box portion by upstanding columns. The space behind columns 41 and above the lower rear portions is basically unobstructed, as is the space in front of columns 41 and below the front portion. The rear portions are formed by a pair of rearwardly extending and rearwardly divergent, laterally spaced beams 40 adapted to protrude beneath the home under structure at the front end thereof for connection to the girders at points spaced to the rear of the home cross member. The upwardly offset, forwardly protruding front portion 42 is at an elevation such that the kingpin depending beneath it can couple to the conventional fifth wheel on the rear of a truck tractor. At the rear of beams 40 are attachment zones where clamping units 48 are mounted to be connected to the girders 22. Between the beams 40 at the rear portions of the assembly, the space is unobstructed to enable the unit to be backed beneath a mobile home or the like in a manner straddling the trailer jack and any other paraphernalia adjacent thereto.

Figure 11:
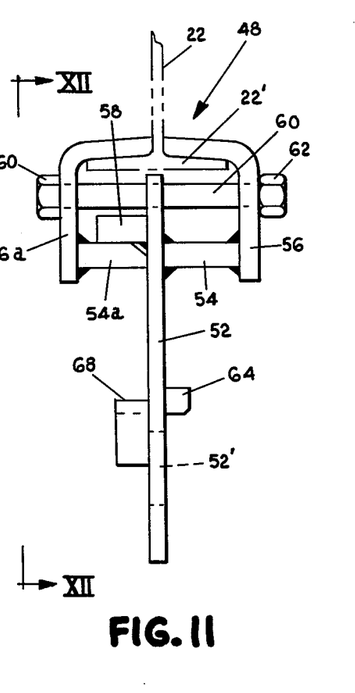
FIG. 11 is an end elevational view of a frame clamp forming part of the assembly.
Figure 12:
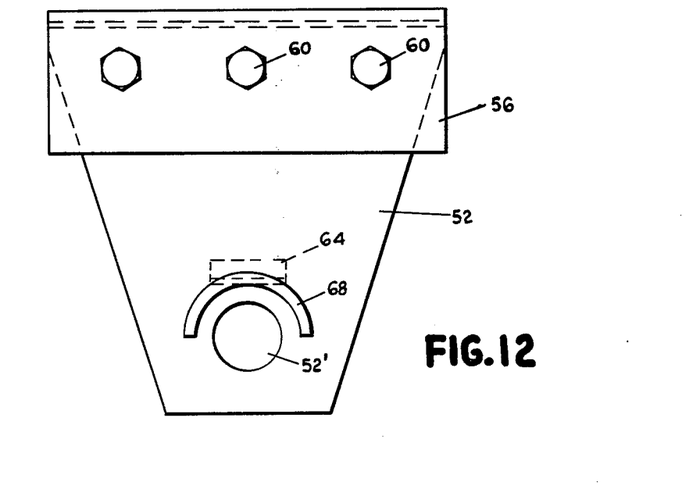
FIG. 12 is a side elevational view of the frame clamp in FIG. 11 taken on plane XII—XII.

Each of the pair of frame clamping subassemblies 48 can be pinned by hanger bolts 50 to one of beams 40. The particular configuration of clamp unit 48 may vary depending upon the shape of girder 22 to which it is to be attached. Typically this girder is an I-beam with upper and lower flanges and an intermediate web (FIG. 11), the clamps being secured over the lower flange and abutting the web. Each clamp includes a depending vertical plate 52 welded or otherwise secured to an abuttment flange 54, which is in turn secured as by welding to an L-shaped clamp jaw 56. The upper horizontal leg of this L-shaped clamp jaw extends above the flange 22' of girder 22 and abuts the web. The other L-shaped clamp jaw 56a has an abuttment flange 54a welded thereto but not attached to plate 52. Flange 54a is aligned by an abuttment 58 secured to plate 52. The upper horizontal leg of this L-shaped bracket 56a extends over the lower flange of girder 22 and abuts against the web in mirror image to clamp 56. A plurality (here three) of elongated bolts 60 are placed through orifices in the two cooperative clamps 56 and 56a and through orifices in the top of plate 52, and secured by nuts 62 to anchor plate 52 to the girder. An orifice 52' is provided in the lower depending portion of plate 52 to receive a hanger pin 50, above orifice 52'. On the inside face of plate 52 is an alignment flange 64 to engage the polygonal head on hanger bolt 50 and prevent it from rotating as the bolt is inserted from the inside out. On the outside face of the plate is a semi-circular shield 68. This cooperates with a fixed sleeve 41 (FIG. 2) on the inside face of the respective beam 40 around opening 70. Specifically, as the beam is raised on the outside face of bracket plate 52, sleeve 41 fits up within the pocket of shield 68 to align opening 70 with opening 52' for easy insertion of the pin.

Basically, clamping units 48 are mounted to the girders of the mobile home to be hauled, before attachment of the towing coupler, and then the rear ends of the beams 40 on each side are elevated for insertion of hanger pins 50 through orifices 70 (FIG. 2) in the beams and orifice 52' (FIG. 11) in plates 52 in a fashion to be described in detail hereinafter.

Figure 2:
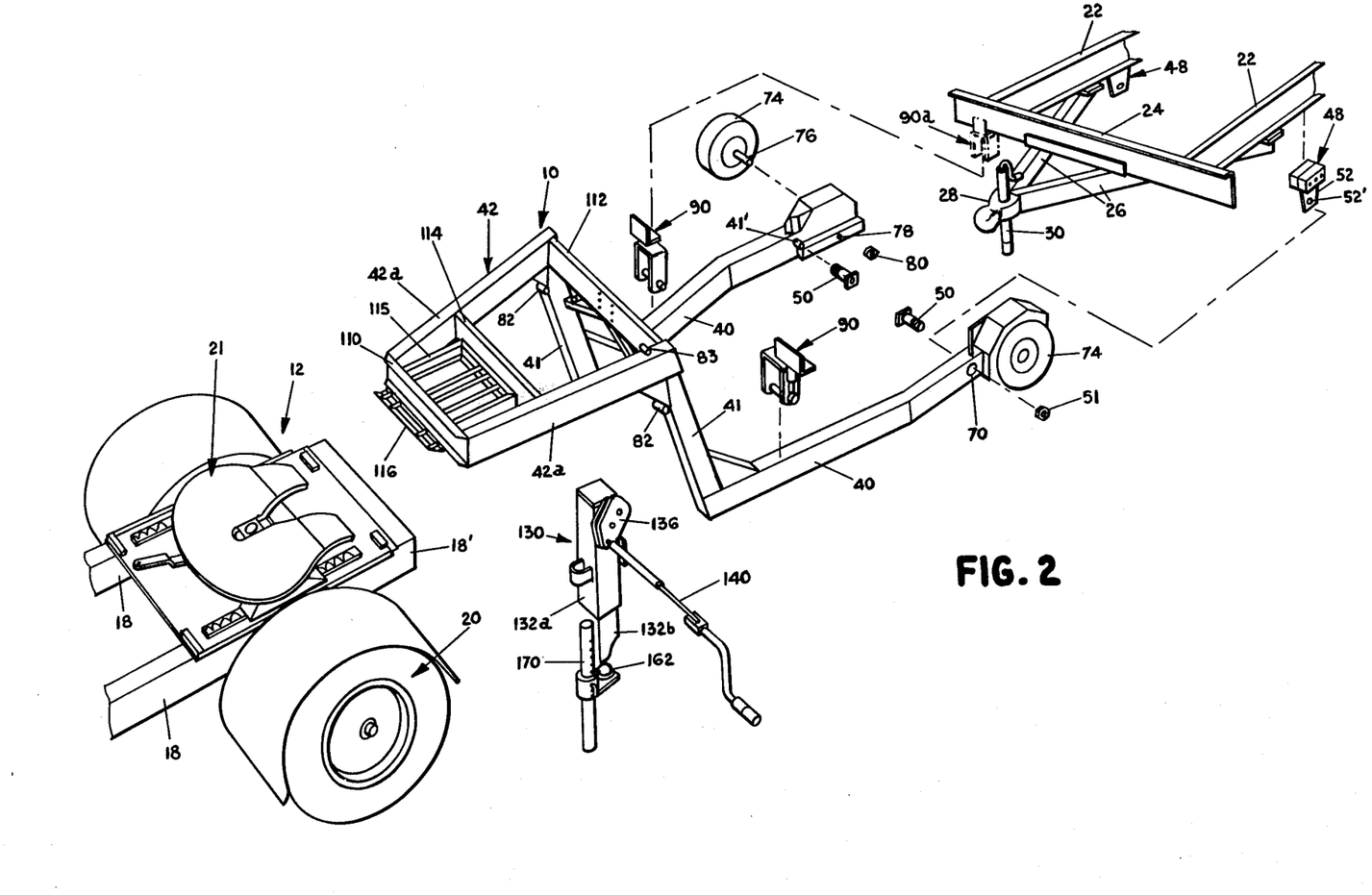
Figure 3:
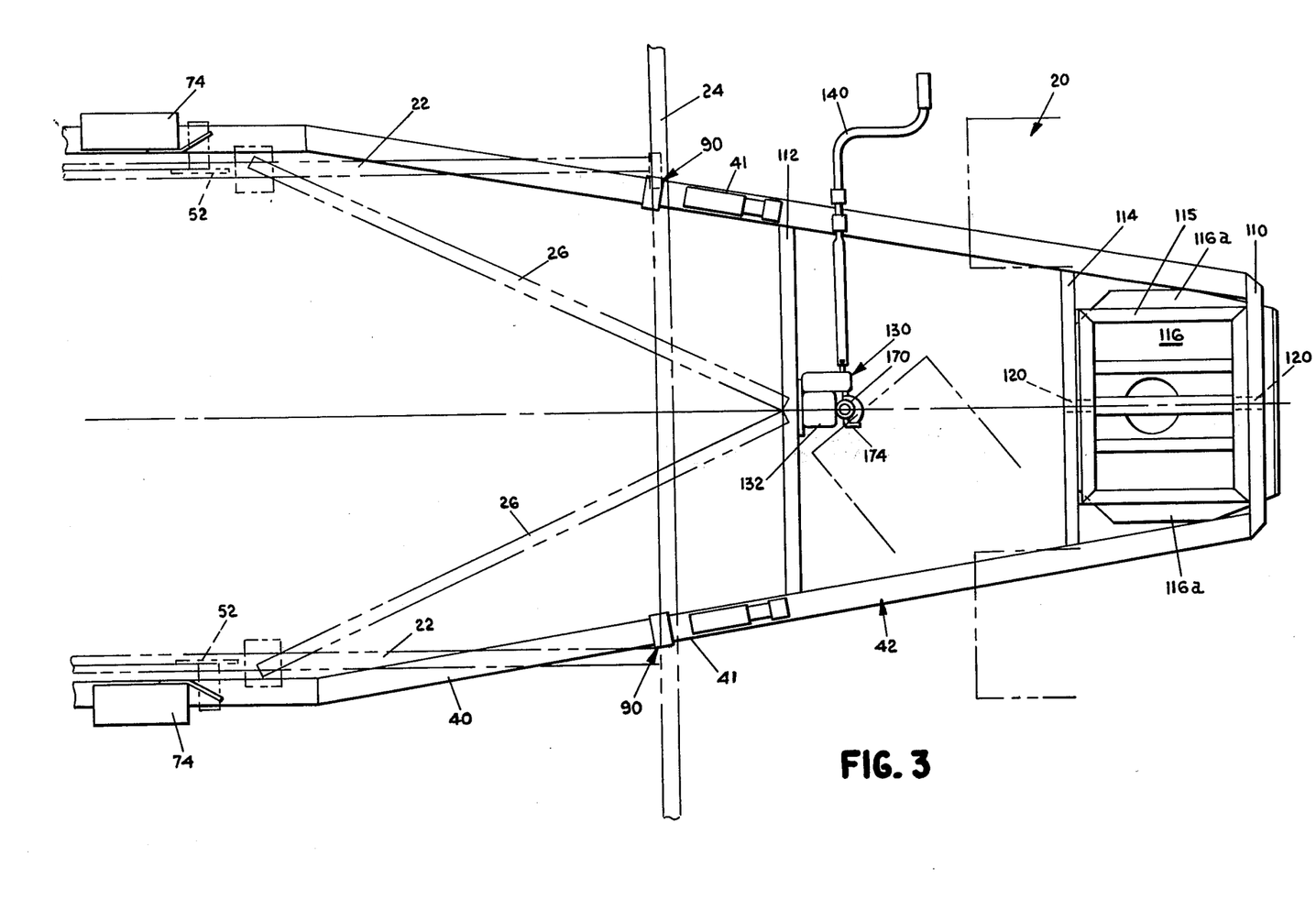
FIG. 3 is a top plan view of the towing coupler assembly.

To enable the towing coupler assembly to be pulled behind a truck without a mobile home being attached thereto, i.e., in the form of a trailer, as during the return trip from a dealer to the factory, a pair of axled wheels 74 are mounted to the rear of beams 40, preferably immediately behind openings 70. EAch wheel 74 includes an axle 76 which extends through a receptacle 78 for attachment by a suitable nut 80 or the like. These wheels are preferably removable because in some instances there is insufficient clearance at the mobile home understructure to receive them when the frame is attached to the mobile home. A pair of mounting sleeves 82 are provided beneath the forward portion 42 and in front of vertical pillars 41 to receive the wheel axles for alternate wheel storage. A spare tire, wheel, and axle can be mounted on sleeve 83 (FIG. 2).

Figure 9:
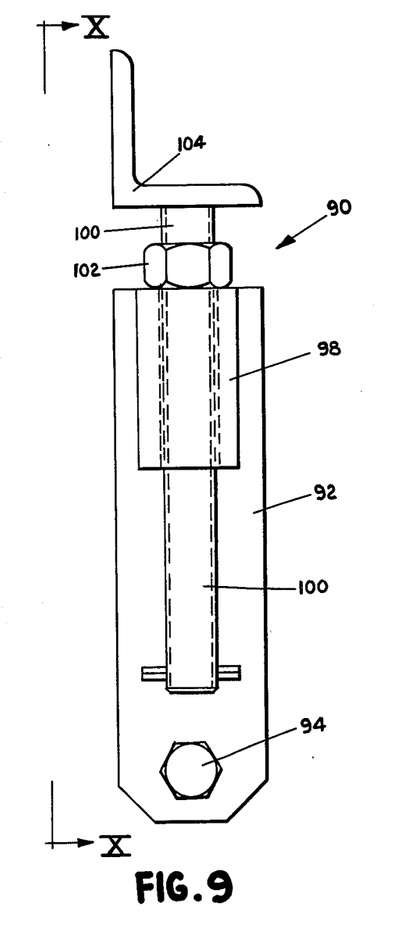
FIG. 9 is a side elevational view of a vertically operative compression load member forming part of the towing coupler assembly.
Figure 10:
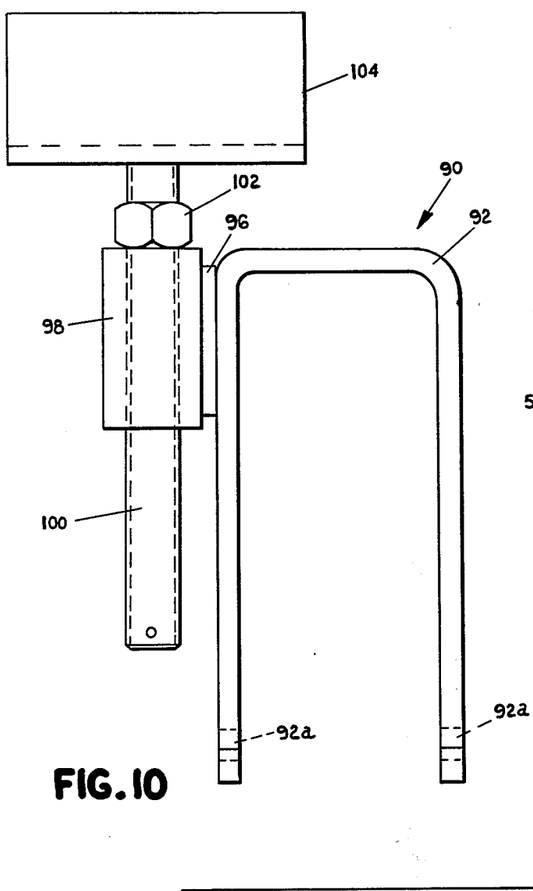
FIG. 10 is an elevational view of the member in FIG. 9 taken on plane X—X.

Also secured to beams 40, ahead of the attachment zone to the mobile home girders, is a pair of compression load units 90. These are longitudinally adjustable along the beams for optimum positioning in engagement with the frame cross member 24 under the home in the fashion indicated by the unit shown in phantom at 90a in FIG. 2. As depicted in detail in FIGS. 9 and 10, each unit 90 includes an inverted generally U-shaped bracket 92 which straddles and rests upon its respective beam 40, and is prevented from removal therefrom by a cross bolt 94 extending through and between the lower ends of the legs of the U-shaped element using orifices 92a. Welded to the side of one of these legs of each slide bracket, on a pad 96, is a vertical collar 98 through which a threaded shaft 100 slidably extends. On the upper end of this threaded shaft is an adjustment nut 102 and an L-shaped rail 104. In use, these units 90 are slid along beams 40, after the beams are pinned to brackets 40 and the kingpin is coupled to the fifth wheel, to adjust the load distribution and the mobile home elevation in a manner to be described in detail hereinafter.

Figure 1:
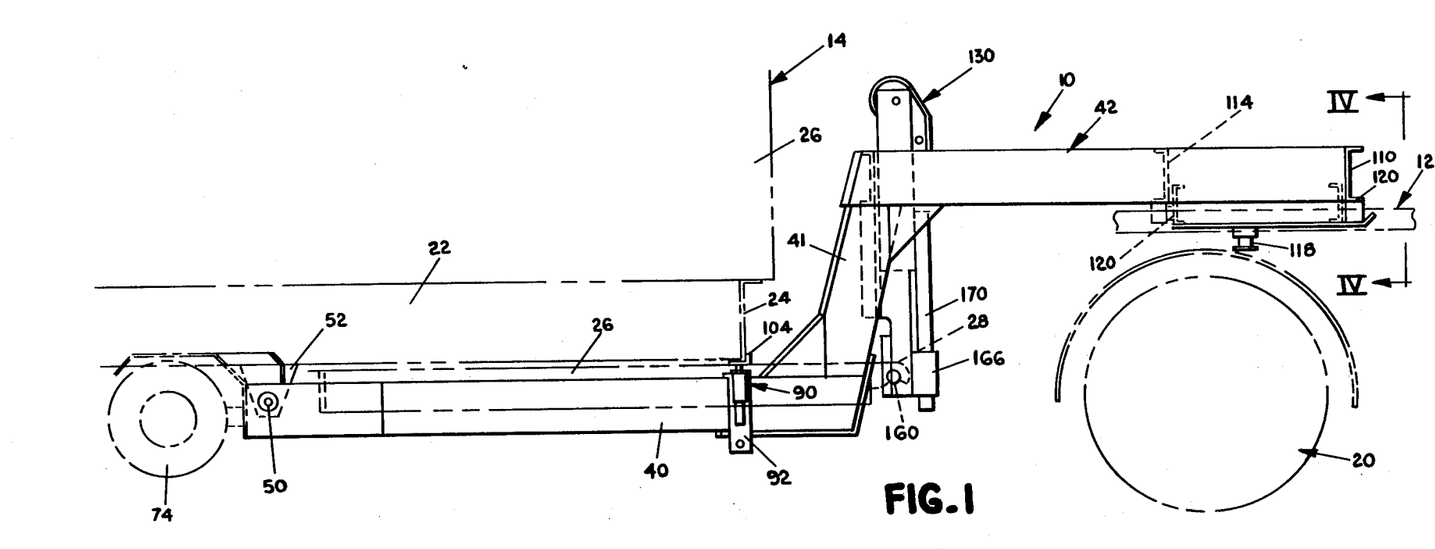
FIG. 1 is a side elevational view of the novel towing coupler assembly, shown attached to the rear of a truck tractor depicted schematically, and secured to a mobile home or the like depicted schematically.
Figure 4:
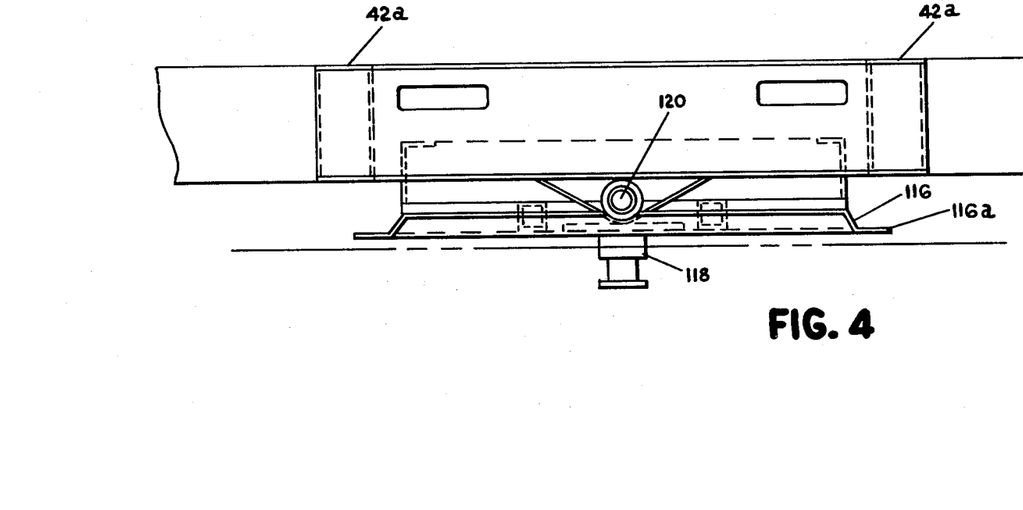
FIG. 4 is an enlarged, fragmentary, front elevational view of the upper front portion of the towing coupler assembly taken on plane IV—IV of FIG. 1.
Figures 5, 6:
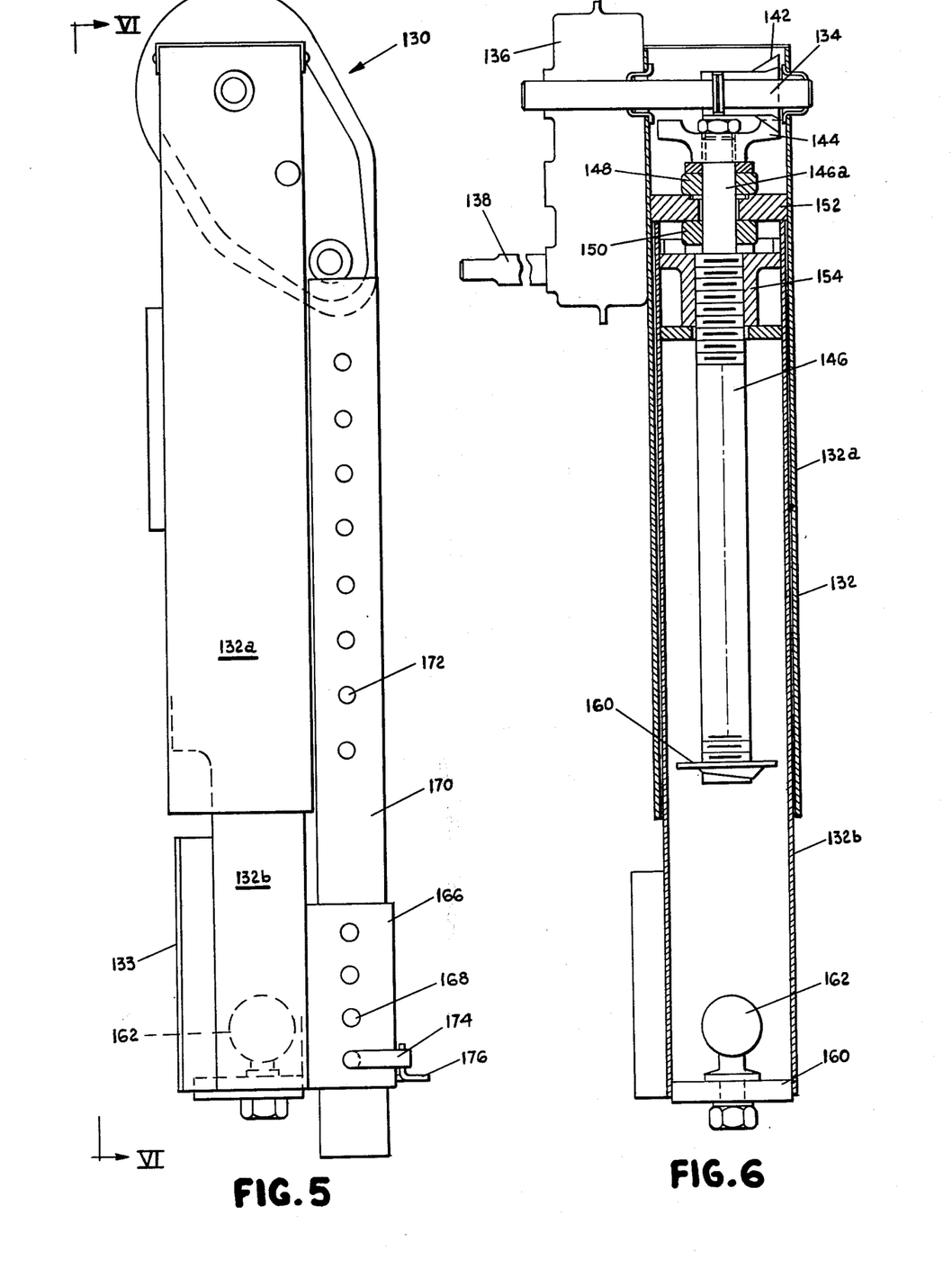
FIg. 5 is an enlarged side elevational view of the jack on the towing coupler assembly of FIG. 1.
FIG. 6 is a rear elevational view of the jack in FIG. 5, taken on plane VI—VI of FIG. 5.
Figure 7:
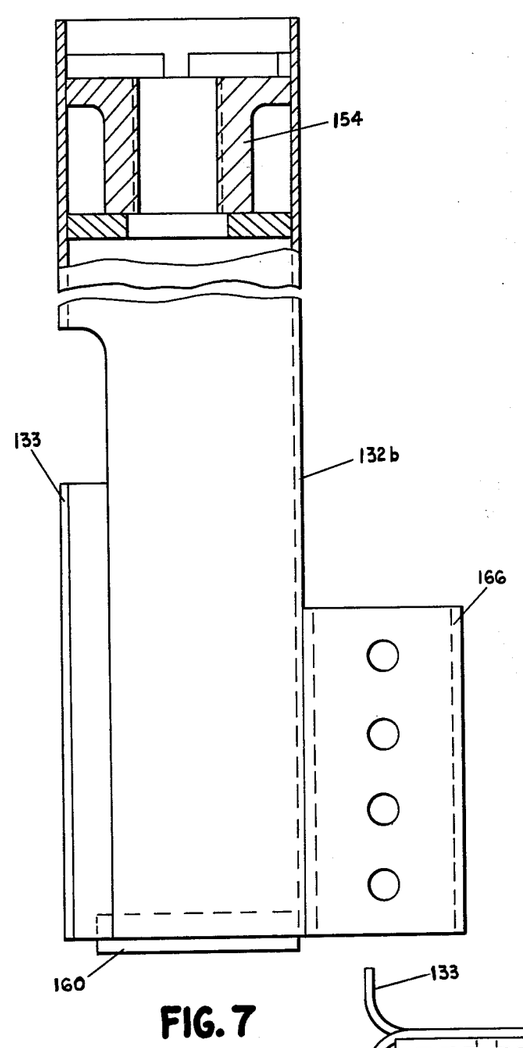
FIG. 7 is an enlarged, fragmentary, side elevational, partial cutaway view of the inner, lower housing portion of the jack in FIGS. 5 and 6.
Figure 8:
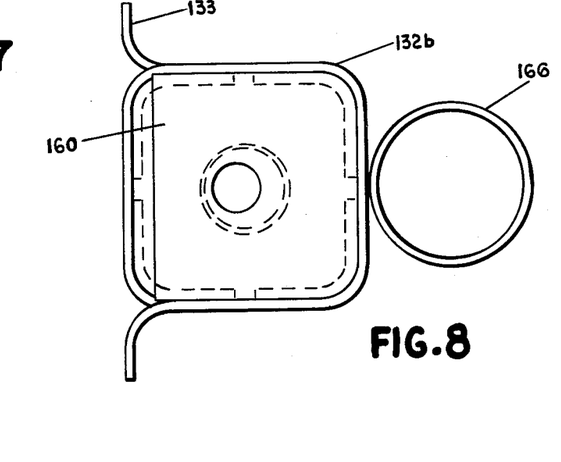
FIG. 8 is a bottom view of the structure in FIG. 7.

The front portion 42 of the towing coupler assembly has a pair of generally forwardly convergent, spaced side beams 42a which, in effect, constitute an extension from the lower rear beams 40, being joined thereto by vertical pillars 41. Members 42a are secured together at the front ends by cross member 110, are secured together above columns 41 by cross member 112, and are secured together by intermediate cross member 114. Between cross members 110 and 114 is a box frame 115 that includes a horizontal bolster plate 116. A kingpin is secured to and depends from the bottom of plate 116. This kingpin is of standard construction, preferably being a two inch SAE kingpin. The bolster plate 116 is mounted to members 110 and 114 on a central, longitudinally extending pivot axis by aligned pivot pins 120 (FIG. 4) retained in collars on members 110 and 114 (FIG. 1). The opposite lateral edges of the bolster plate include stop flanges 116a adapted to abut either of members 42a when the bolster plate is tilted to an angle of approximately twelve degrees from horizontal. This enables definite but limited tilting movement of the home relative to the tractor as will be understood.

Generally centrally between and slightly forwardly of vertical columns 41 is special jack subassembly 130. It includes an elongated, vertical, telescopic housing 132 formed of upper outer telescoping member 132a, into the open lower end of which is received lower inner telescoping member 132b. These are preferably of polygonal cross sectional configuration. A conventional two speed gear box 136 is attached to the outside of the upper end of member 132a. The mechanism (not shown) of this gear box is attached to the protruding end of a shaft 134 rotatably supported in member 132a, and includes a protruding crank connector 138 for attachment of a foldable hand crank 140 (FIG. 2). Inside housing portion 132a on shaft 134 is a bevel gear 142 which engages gear 144 secured to the upper end 146a of vertical threaded shaft 146. This shaft is retained axially in position in housing portion 132a by its pair of upper and lower thrust bearings in the form of collars 148 and 150 straddling an anchor plate 152 secured to the inner periphery of housing portion 132a. An internally threaded collar 154 is threadably engaged with shaft 146, and is secured to the inner periphery of the upper end of the lower housing portion 132b. Thus, rotation of shaft 146 in opposite directions causes collar 154 and lower housing portion 132b to rise or descend relative to outer housing portion 132a. Stop collar 160 on the lower end of shaft 146 limits telescopic extension of housing 132. Shaft 146 is rotated by turning crank 140, connector 138, the internal mechanism of gear box 136, shaft 134, bevel gear 142, and gear 144.

The lower portion of housing member 132b is open to the rear. This can be done by vertically slitting the tubular housing and bending the flanges laterally outwardly at 133 to form guides. Mounted in this lower end of housing member 132b in this opened area is an anchor plate 160. It has an orifice to receive the threaded stud of a conventional hitch ball 162. The ball is located within the open housing portion.

Secured to the forward face of housing member 132b is a vertical collar 166 having a plurality of transverse openings 168 therethrough. It slidably receives an elongated quick drop leg 170 therethrough. Drop leg 170 also has a plurality of transverse openings 172. A cross pin 174 is configured to extend through openings 168 and 172 to fix the position of the drop leg, and has a safety latch 176 to retain it in position. Thus, by pulling pin 174 and dropping leg 170 to the desired elevation and then replacing pin 174 and its safety latch 176, the initial elevation of this jack can be achieved. The crank mechanism is then employed to adjust it further.

OPERATION OF THE APPARATUS

Assuming that the towing coupler assembly 10 is not connected to a mobile home or to a truck tractor and that the driver of the tractor must take assembly 10 to a prefabricated home factory to deliver a home to a dealer, assembly 10 then will be resting upon its wheels 74 and its jack 130. To hook up to it, the truck tractor is backed up near it to determine whether kingpin 118 on assembly 10 is at the proper elevation to connect to fifth wheel coupler 21 on the tractor. Any necessary height adjustments of assembly 10 are made by adjusting crank 140 on jack 130. The truck is then backed into engagement with kingpin 118. As soon as kingpin 118 is clamped in the jaws of the fifth wheel coupler, quick drop leg 170 is elevated, and the driver tows assembly 10, as a trailer, to the factory.

To connect to a mobile home having the conventional A-frame and ball coupler on the front, he backs assembly 10 under the front end of the home, with beams 40 straddling the conventional jack and A-frame hitch on the front of the home, until assembly jack 130 is adjacent the ball coupler 28 on the A-frame of the mobile home. The ball 162 on housing member 132b is vertically adjusted until it is at a proper height to move beneath coupler 28. The assembly 10 is then backed up further until ball socket 28 is directly above ball 162. Ball 162 is then elevated by crank 140 until it enters socket 28 and is locked in place. Quick drop leg 170 is then lowered to approximately 1 inch above the ground. The fifth wheel 21 is then released and the tractor is driven out of the way.

Using the ball 162 in socket 28 as a fulcrum, assembly 10 is then manually manipulated to assure alignment of the rear end of beams 40 with girders 22 on the mobile home. This manipulation can be readily achieved by one person simply by pressing down on forward portion 42 of assembly 10, to hoist the rear ends thereof, since unit 10 is purposely built to cause its center of gravity to be approximately at ball 162. At this time or previously, a pair of clamp units 48 (FIG. 11) are attached to the girders 22 of the home as previously described, and bolt 60 and nut 62 are tightened finger tight. Next, one of the aligned beams 40 is lifted and bolt 50 is inserted through orifice 70 and orifice 52' of one of the clamp units, and nut 51 is tightened finger tight to hold this side of the unit up in position temporarily. Then the opposite beam 40 is elevated and one of the hanger pins 50 is inserted through those orifices 70 and 52' for this beam, and the appropriate nut 51 attached to secure the hanger bolt. All of the nuts and bolts are then tightened securely with a wrench.

Now that the rear ends of the unit are secured, jack 130 is adjusted with crank 140 to elevate the front end of the unit 10 including kingpin 118 for proper hookup height to the fifth wheel on the tractor. The tractor is then backed up until the kingpin is latched in place on the fifth wheel. Then jack support 130 is raised until the connection of the kingpin to the fifth wheel hitch supports the front end of the structure. The conventional trailer tongue jack 30 is then elevated to place the weight of the load on the truck tractor through the fifth wheel. The quick drop leg 170 on jack 130 is elevated to prevent it from striking anything during motion.

Next, jack 130 is adjusted up or down to level the load, by lowering or raising the ball hitch and A-frame, which is done by lowering or raising ball 162 with the jack. Then the vertical compression load members 90 are adjusted beneath cross beam 24 of the mobile home. This relieves the load carried by the ball hitch and transfers it to the front cross beam 24. This enables optimum load leveling. Usually the mobile home is made level front to rear in this fasion. It can alternatively be at a desired angle. The unit is then ready for hauling.

It will be noted that the hookup can be made by one man. Vertical adjustment is also optimized for level position of the home. Minor irregularities in the road surface can be accommodated because of the pivotal or oscillatory motion, within limits, of bolster plate 116 to prevent racking of the home. The unit can haul mobile homes with or without a removable A-frame. It is not necessary to use the ball or ball coupler for towing purposes. Yet the unit does not require the removal of the conventional A-frame and ball coupler, thereby maintaining the ability to alternately tow the trailer with the ball hitch. The connection to the ball allows its use as a fulcrum when aligning the coupler assembly. And, although no significant pulling stress is applied to the ball when using the novel assembly, an added safety factor is provided through this connection.

With the fore-to-aft adjustable fifth wheel coupler 21 employed in the combination, it can be shifted forwardly during hauling. This has two advantages. Firstly, this shifts weight to the front wheels of the towing vehicle for more stable hauling and better driver control. Secondly, sliding coupler 21 forward effects minimum overall length to meet highway regulations. And yet, once the unit is at a trailer lot or the like, coupler 21 can be shifted rearwardly to provide sufficient clearance between home and tractor to enable the home to be backed into position at turns, relative to the tractor, up to 90°.

Once the unit is at the desired destination, unhooking is achieved by the driver. Firstly, mobile home jack 30 is lowered to carry its normal load. Then, the two vertical compression load members 90 are lowered to release them from the mobile home. Then, quick drop leg 170 of jack 130 is lowered near the ground, i.e., about 3 inches above the ground. Subsequently, coupler 28 is unlatched from ball 162, and jack 130 is lowered firmly onto the ground by crank 140. Then, hanger bolts 50 are removed to release beams 40 from girders 22. Jack 130 is lowered further until wheels 74 engage the ground and drop leg 170 lifts off the ground. This drop leg 170 is then raised to full up position. The driver then removed clamps 48 and is ready to return with assembly 10 to his original destination.

If the driver chooses to release the towing coupler assembly with the mobile home, as for example along the highway when curfew hours for mobile homes have been reached and he wishes to travel to a motel in his truck tractor, he can disconnect very simply. Specifically, drop leg 170 is lowered to the ground, coupler 28 is released from ball 162, and jack 130 is operated until the load is carried thereon. He unhooks kingpin 118 from fifth wheel 22 and drives off to his destination. The unit 10 remains attached to the home until he returns and recouples.

As noted from the foregoing description, the novel assembly has particular adaptability to function in cooperation with the conventional A-frame and ball coupler normally found on this type of load. However, the unit can be employed to attach to, haul, and release from loads having no A-frame and ball coupler also. Connection to such a load proceeds basically as follows.

The unit 10, coupled to the tractor 12, is backed up to the home or the like, while being lined up therewith, i.e., preferably no more than about 1 inch off center, and within about 6 inches of the home front end. The quick drop leg is dropped and pinned, and jack 130 is operated to lower the jack leg further to carry the weight of the unit 10. Coupler 21 is released and tractor 12 is driven forward several feet. Using the jack support as a fulcrum (since there is no ball and ball coupler connection to use as a fulcrum as previously), the operator presses down manually on the front end of unit 10 to swing the rear end portions into alignment with the girders 22. Clamps 48 are attached to girders 22, and the rear ends of beams 40 are raised and bolted to the clamps as previously. Assuming the load is in level position, the unit 10 is raised with jack 130 until the kingpin bolster plate is almost as high as coupler 21. Compression load units 90 are then slid under cross member 24 and raised up tightly against it. Jack 130 is then given a final adjustment to assure the kingpin is at a proper height for the fifth wheel, and tractor 12 is backed up to couple the kingpin and fifth wheel. The jack support is then fully raised. To assure no side shifting of the home front end on unit 10, suitable tie means, such as chains and chain binders, are secured between the opposite ends of cross beam 24 and the forward portions of unit 10, e.g., columns 41.

Connection of unit 10 to the load without the A-frame and ball coupler is advantageous for reduction of overall length, and for reduction of cost to the home builder.

Many additional objects and advantages of this invention will no doubt be apparent from studying the specific embodiment which is disclosed as the preferred embodiment of this invention. These modifications include variations to adapt to particular structures and styles thereof. Such modifications are deemed to be within the scope of the invention which is to be limited only by the scope of the appended claims and the reasonable equivalents thereto.

The embodiments of the invention in which an exclusive property or privilege is claimed are defined as follows:

1. An attachable-detachable towing coupler assembly for mounting to and towing of, from the front end, a parallelepiped structure having supporting under-girders and a wheeled undercarriage, comprising:
   a bifurcated frame having a front portion and rear portions; said rear portions being shaped to extend beneath the structure front end, being spaced from each other and including attachment zones connectable to under-girders of the structure spaced rearwardly from the front end of the structure; said frame front portion being upwardly offset relative to said frame rear portions and having cooperative coupling means thereon connectable with complementary coupling means on a towing vehicle to enable a stable elevated coupling thereto; and compression-load, structure-engagement means on said frame between said front and rear portions, to selectively engage the structure front end, thereby affording a multiple point securement for the structure while towed on its wheeled undercarriage.

2. The towing coupler assembly in claim 1 wherein said compression-load, structure-engagement means are vertically operable, and are located forwardly of said attachment zones to be adapted to engage the front of the structure and impart to said frame a controlled amount of vertical compression loading from the structure.

3. The towing coupler assembly in claim 2 wherein said frame has a pair of beams which are rearwardly divergent to said rear end portions, and said compression-load, structure-engagement means are on said beams.

4. The towing coupler assembly in claim 1 including a ground engaging jack, and a coupler ball on said jack generally intermediate said front and rear portions, oriented for coupling connection to a standard ball coupler on the front end of the structure.

5. The towing coupler assembly in claim 4 having its center of gravity proximate said coupler ball, to enable easy connection and disconnection of said attachment zones to the structure under-girders while using said coupler ball as a fulcrum.

6. The towing coupler assembly in claim 1 including a bolster to which said cooperative coupling means is secured and which is mounted to said front end portion for limited pivotal movement on a longitudinal pivot axis.

7. The towing coupler assembly in claim 1 wherein said cooperable coupling means comprises a kingpin.

8. A towing coupler assembly for a factory made home or the like having structural support under-girders, a front cross beam, and a wheeled undercarriage, comprising:
   a bifurcated frame having a front end portion and including a pair of beams joined at said front end portion and rearwardly divergent to a pair of spaced rear end portions;
   said front end portion being upwardly offset relative to said beams and rear end portions and having a kingpin coupler for connection to a mating fifth wheel coupler on a truck tractor;
   vertical compression load units on both said beams, forwardly of said rear end portions, to engage the front cross beam of the home and operable to receive and impart controlled compression load to said frame from said home; and said rear end portions being attachable to the home under-girders, whereby said coupler assembly effects a multiple point connection to the home and an elevated fifth wheel connection to the towing vehicle for stable towing of the home.

9. The towing coupler assembly in claim 8 wherein said vertical compression load units are movable along said beams for accurate positioning beneath the cross beam of the particular home being towed.

10. The towing coupler assembly in claim 8 including a bolster to which said kingpin coupler is secured, and which is mounted at said frame front end portion on a longitudinal pivot axis, there being limit means between said bolster and said front end portion to limit pivoting of said bolster.

11. The towing coupler assembly in claim 10 including a coupler ball intermediate said front and rear end portions at an elevation to connect with a standard ball coupling on the home front end.

12. The towing coupler assembly in claim 11 having its center of gravity proximate said coupler ball to enable easy connection and disconnection of said rear end portions to the under girders while using said coupler ball as a fulcrum.

13. A combination factory built home and towing coupler assembly comprising:

a factory built home having elongated under-girders and a cross beam at the front thereof, and a wheeled undercarriage toward the rear thereof; a towing coupler assembly having lower rear portions extending under the front of said home and having connections to said girders, and an upwardly offset front portion projecting forwardly of said home; home engagement means forwardly of said connections to said girders; and kingpin coupling means depending from the underside of said front portion.

14. The combination in claim 13 wherein said home engagement means includes vertically operable compression load means.

15. The combination in claim 14 wherein said home includes a ball type hitch coupler on an A-frame projecting forwardly of said front end and said towing coupler assembly includes a hitch ball connected to said ball type hitch coupler.

16. The combination in claim 13 wherein said home includes a ball type hitch coupler on an A-frame projecting forwardly of said front end and said towing coupler assembly includes a hitch ball connected to said ball type hitch coupler.

17. The combination in claim 16 wherein said home includes a jack on said A-frame, and said lower rear portions include a pair of laterally spaced rearwardly projecting beams defining an unobstructed space therebetween to form a bifurcated arrangement adapted to straddle said A-frame jack.

18. The combination in claim 16 including a ground-engageable telescopic jack on said towing coupler assembly and to which said hitch ball is connected.

19. The combination in claim 13 wherein said kingpin coupling means includes a bolster mounted on a longitudinal pivot axis and having stop means to limit pivoting of said bolster to a small acute angle.

20. The combination in claim 13 wherein said connections include removable clamp means secured to said girders and pinned to said lower rear portions.

21. The combination in claim 13 including a truck tractor having a fore-to-aft shiftable fifth wheel coupler connected to said kingpin coupling means.

* * * * *